July 10, 1962    G. STAVIS ET AL    3,044,003
FREQUENCY TO SIMULATED SYNCHRO OUTPUT CONVERTER
Filed Dec. 16, 1959    2 Sheets-Sheet 1

INVENTORS.
GUS STAVIS
ROBERT GROSSMAN
BY
ATTORNEY.

INVENTORS.
GUS STAVIS
ROBERT GROSSMAN

BY

ATTORNEY

United States Patent Office 3,044,003
Patented July 10, 1962

3,044,003
FREQUENCY TO SIMULATED SYNCHRO OUTPUT CONVERTER
Gus Stavis, Briarcliff Manor, N.Y., and Robert Grossman, Encino, Calif., assignors to General Precision, Inc., a corporation of Delaware
Filed Dec. 16, 1959, Ser. No. 860,042
14 Claims. (Cl. 321—3)

This invention relates generally to signal conversion systems and particularly to apparatus for converting a variable frequency signal to a simulated synchro transmitter output. More specifically, the invention is directed to apparatus which represents the frequency of a source of alternating current as the relative magnitudes of the voltages between three conductors, the relative voltage magnitudes varying with frequency in the same way that the voltages of the three output conductors of the stator of a synchro transmitter vary with the angular position of the rotor.

Physical quantities such as speed, temperature, pressure, etc., are often measured as analogs which take various forms such as the displacement of a body, the magnitude or frequency of a voltage, the angular position of a shaft, etc. In order to utilize the results of the measurements for display or computation, it is frequently necessary to transform one analog representation, such as a voltage magnitude, into another form such as a shaft position. One of the most versatile analog representations is that in which the physical quantity is represented as the difference in the magnitudes of alternating voltages appearing on three conductors. This form is widely used in connection with the familiar self synchronous devices, or synchros, and is sometimes referred to simply as three wire information. Some of the virtues of three wire information are the ease with which it may be transmitted from place to place by means of a three conductor cable, its freedom from errors due to moderate fluctuations in line voltages, and its ready convertibility to other forms, such as a voltage magnitude or a shaft position, with well known components such as synchros and servos.

In a Doppler navigation system, the ground speed of the aircraft is usually measured in the first instance as the frequency of an alternating current. Effective utilization of the information requires its transmission to one or more remote points at each of which it is converted to a form suitable for use with other equipment. For example, ground speed information is usually transmitted to the instrument panel where it is visually displayed as the position of a pointer and additionally is often transmitted to a computer where present position, distance traveled, and other useful information may be derived. The requirements of transmission to remote points and of subsequent conversion to other forms has made it customary to convert the frequency variations to three wire information for transmission.

The conversion of the frequency of the oscillator of a Doppler system to other analog forms is made difficult by the range of frequencies involved which may be ten to one, twenty to one or even thirty to one. In the past, the conversion has been made by applying the oscillator output to a cycle counting frequency measuring system such as that described in the Gray Patent No. 2,584,866, which, with the aid of a servomechanism, positions the wiper of a potentiometer so that both the potential of the wiper and its angular position are linear functions of the input frequency. A synchro transmitter having its rotor connected to the potentiometer shaft completes the conversion to three wire data. Such a system, although operating satisfactorily, has the disadvantages of great size, weight and cost due to the presence of the servomechanism and its attendant moving parts.

It is a general object of the present invention to provide apparatus for generating voltages on three conductors the differences between which represent the frequency of an alternating current source.

Another object is to provide apparatus which eliminates the need for synchros and servomechanisms yet provides three wire information representing the frequency of an alternating current.

Another object is to provide inexpensive apparatus of small size and low weight for generating a simulated synchro output indicative of the frequency of an alternating current.

Briefly stated, the alternating current source (or in some cases an auxiliary voltage derived therefrom) is passed through a delay line which delays all frequencies by the same fixed amount so as to obtain a voltage the phase shift of which, relative to the input, is a linear function of frequency. Additionally, apparatus is provided which derives from the source three voltages displaced in phase from each other by 120°. The output of the delay line is connected to each of three phase sensitive detectors each of which is controlled or keyed by one of the three phase displaced voltages. The output of each phase sensitive detector is a unidirectional voltage the magnitude of which is a function of both the phase shift imposed by the delay line and the phase of the controlling voltage. Each of these unidirectional voltages is converted to an alternating voltage of convenient frequency by inverting circuits, such as 400 cycle choppers, so that the resulting voltages have relative magnitudes which vary with input frequency in the same way that synchro output voltages vary with shaft position.

For a clearer understanding of the invention reference may be made to the following detailed description and the accompanying drawing, in which.

Figures 1, 2:
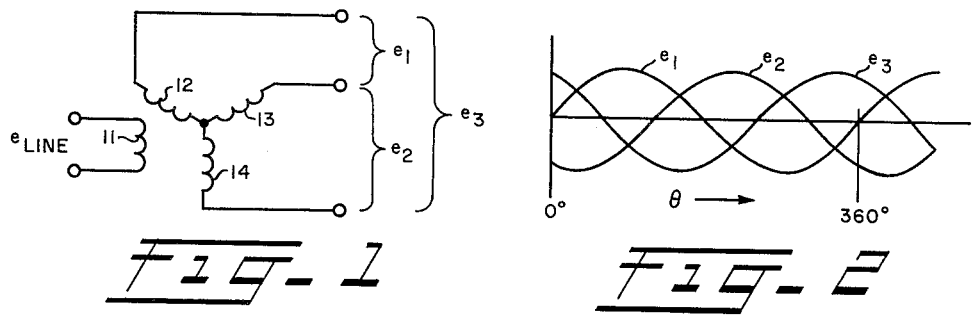
FIGURE 1 is a schematic diagram of a synchro transmitter.
FIGURE 2 is a group of curves depicting the output voltages of a synchro transmitter as a function of rotation.

Referring first to FIG. 1, there is shown schematically a conventional synchro transmitter comprising a rotor winding 11 and three stator windings 12, 13 and 14. When the rotor winding is excited by alternating current as by connection to a line, three voltages $e_1$, $e_2$ and $e_3$ will appear across the output terminals. These voltages although in time phase with each other, have different amplitudes, depending upon the angular position of the rotor winding with respect to the stator windings. The amplitude variations of each of the voltages $e_1$, $e_2$ and $e_3$ as a function of $\theta$, the angular position of the rotor, is shown in FIG. 2 from which it can be seen that each varies sinusoidally and that corresponding peaks are displaced from each other by 120°.

The present invention generates three voltages of a convenient frequency such as 400 c.p.s. the amplitudes of which vary with the frequency of an alternating current source in the same way that the amplitudes of voltages $e_1$, $e_2$ and $e_3$ of FIGS. 1 and 2 vary with the shaft angle $\theta$.

Figure 3:
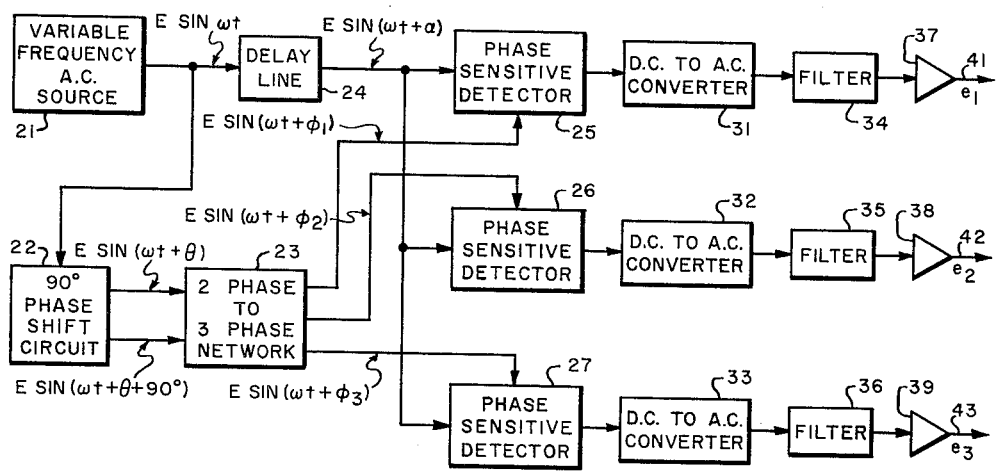
FIGURE 3 is a block diagram of one embodiment of the invention.

Turning now to FIG. 3, there is shown a source of alternating current 21 such as an oscillator the frequency of which may be varied manually or automatically. The output voltage $E \sin \omega t$ is led to a phase shifting circuit 22, about which more will be said later, which provides two output voltages $E \sin (\omega t + \theta)$ and $E \sin (\omega t + \theta + 90°)$ displaced in phase with respect to each other by ninety degrees. These voltages are applied to a network 23 which derives therefrom three output voltages displaced in phase from each other by one hundred and twenty degrees, designated $E \sin (\omega t + \phi_1)$, $E \sin (\omega t + \phi_2)$ and $E \sin (\omega t + \phi_3)$ where $\phi_1$, $\phi_2$ and $\phi_3$ differ by 120° from each other. The network 23 may be the familiar Scott connection, sometimes called a Scott T.

The output voltage of the source 21 is also applied to a delay line 24 which is constructed according to standard commercial practices so as to delay all frequencies within the band of interest by the same fixed amount of time and also to attenuate all such frequencies uniformly. Since the time delay is constant it follows that the phase of the output with respect to the input is a linear function of the applied frequency.

The output voltage from the delay line 24, designated $E \sin (\omega t + \alpha)$, where $\alpha$ is a linear function of $\omega$, is applied to three identical phase sensitive detectors 25, 26 and 27 to each of which is also applied one of the output voltages from the network 23. The details of the phase sensitive detectors 25, 26 and 27 will be fully described subsequently but for present purposes it is sufficient to note that each provides a unidirectional voltage the magnitude and sign of which is a linear function of the cosine of the difference between the phase angle $\phi$ of the voltage from network 23 and the phase shift angle $\alpha$ of the voltage from the delay line 24. As will be more fully explained, the effect of the phase angle $\phi$ of each voltage from the network 23 is to shift by 120° the value of the phase shift angle $\alpha$ at which each unidirectional voltage reaches its maximum. The result is that the magnitudes of the unidirectional voltages from the detectors 25, 26 and 27 vary with the phase shift angle $\alpha$ (and therefore with the frequency of the source 21) in the same way that the voltages $e_1$, $e_2$ and $e_3$ of FIG. 2 vary with the angle $\theta$.

The unidirectional output voltages from the detectors 25, 26 and 27 are applied to three D.C. to A.C. converters 31, 32 and 33 respectively, the function of which is simply to convert the unidirectional voltages to alternating voltages of suitable frequency having similar magnitudes. The converters 31, 32 and 33 may be simple vibratory contacts, or choppers, synchronously driven from a source of convenient frequency such as 400 c.p.s. It would, of course, be possible to use diode or transistor converters but at present the mechanical vibrators are preferred because of their simplicity, proven reliability and low cost.

The voltages from the converters 31, 32 and 33 are passed through filters 34, 35 and 36 respectively, the outputs of which are applied to amplifiers 37, 38 and 39 and thence to the output conductors 41, 42 and 43. The filters 34, 35 and 36 serve to make the output voltages more nearly sinusoidal in form and may be simple tuned circuits, separate as shown in FIG. 3, or incorporated into the amplifiers 34, 35 and 36. If the output conductors are connected to a reactive load, such as a synchro control transformer, the filters may in some cases be omitted.

Figure 4:
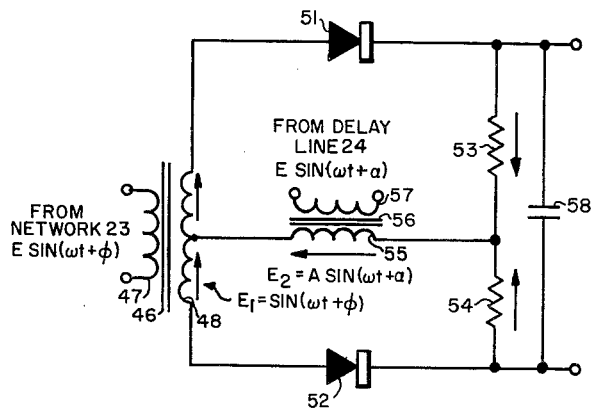
FIGURE 4 is a schematic diagram of a phase sensitive detector circuit.

Turning now to FIG. 4, there is shown one form of phase sensitive detector suitable for use in the present invention. A transformer 46 has its primary winding 47 connected to one of the outputs of the network 23 and also has a center tapped secondary winding 48 the extremities of which are connected to like electrodes, for example the anodes, of two rectifiers 51 and 52. Two serially connected resistors 53 and 54 have their opposite ends connected to the other electrodes (cathodes as shown in the drawing) of the rectifiers 51 and 52 respectively. The center tap of the winding 48 is connected to one terminal of the secondary winding 55 of a transformer 56, the other terminal being connected to the junction of the resistors 53 and 54. The primary winding 57 of the transformer 56 is connected to the output of the delay line 24. Output is taken across the serially connected resistors 53 and 54 which are shunted by a capacitor 58.

In order for the magnitude of the unidirectional output voltage to be a linear function of the cosine of the angles $\phi$ and $\alpha$, it is necessary that the magnitude of one of the voltages induced in secondaries 48 and 55 be very much larger than the other. In FIG. 4, the voltage induced in each half of the secondary 48 is designated $E_1$ and is assumed to have a maximum value of unity so that the voltage may be expressed as $$E_1 = \sin (\omega t + \phi) \qquad (1)$$

The voltage induced in the secondary winding 55 is designated $E_2$ and is assumed to have a maximum value much less than that of $E_1$, preferably on the order of one-tenth of $E_1$, and may be expressed as $$E_2 = A \sin (\omega t + \alpha) \qquad (2)$$

where $A$ is on the order of 0.1. These relative magnitudes may be obtained readily by suitably selecting the turns ratios of the transformers 46 and 56.

The voltage applied to the upper loop of the circuit of FIG. 4 is $E_2 + E_1$ which, after simple manipulation, becomes $$E_2 + E_1 = \sin \omega t (A \cos \alpha + \cos \phi) + \cos \omega t (A \sin \alpha + \sin \phi) \qquad (3)$$

Because of the presence of rectifiers 51 and 52, absolute values only are of interest. By use of the trigonometric identity $$C \sin \theta + D \cos \theta = \sqrt{C^2 + D^2} \sin \left(\theta + \arctan \frac{D}{C}\right) \qquad (4)$$

the absolute value can be expressed as $$|E_2 + E_1| = \sqrt{1 + A^2} \sqrt{1 + \frac{2A}{1 + A^2} \cos (\phi - \alpha)} \qquad (5)$$

Since $A \ll 1$, Equation 5 can be evaluated by using the first two terms of the binomial expansion.

$$|E_2 + E_1| \approx \sqrt{1 + A^2} \left[1 + \frac{A}{1 + A^2} \cos (\phi - \alpha)\right] \qquad (6)$$

The voltage applied to the lower loop is $E_2 - E_1$ and by a similar process the absolute value can be expressed as $$|E_2 - E_1| \approx \sqrt{1 + A^2} \left[1 - \frac{A}{1 + A^2} \cos (\phi - \alpha)\right] \qquad (7)$$

Because of the polarity of the rectifiers 51 and 52 as shown in FIG. 4, the voltage drops across the resistors 53 and 54 will be in opposition and the resultant may be expressed as $$|E_2 + E_1| - |E_2 - E_1| \approx \frac{2A}{\sqrt{1 + A^2}} \cos (\phi - \alpha) \qquad (8)$$

It is therefore apparent that the output voltage of each of the networks 25, 26 and 27 is a unidirectional voltage the magnitude of which is a linear function of the cosine of the phase shift angle $\alpha$, and that the value of $\alpha$ for which each voltage has a positive maximum depends upon the angle $\phi$. The phase angle $\phi$ of the voltage applied to any one of the detectors 25, 26 and 27 does not vary but is the fixed angle $\phi_1$, $\phi_2$ or $\phi_3$, as the case may be. Therefore any variation of the magnitude of any output voltage is attributable solely to a corresponding variation in the value of $\alpha$. However, since $\phi_1$, $\phi_2$ and $\phi_3$ are displaced from each other by one hundred and twenty degrees, the three unidirectional output voltages will vary with $\alpha$ the same way the three voltages $e_1$, $e_2$ and $e_3$ of FIG. 2 vary with the angle $\theta$.

Let it be assumed that the source 21 of FIG. 3 may vary throughout the range from 600 kc. p.s. to 620 kc. p.s. In order to have the output voltages go through one cycle as the input frequency varies from 600 kc. p.s. to 620 kc. p.s., the 620 kc. p.s. voltage should be delayed by one period more than the 600 kc. p.s. voltage so that the phase shift angle α will vary by 360°. It can be shown readily that the delay time T required to delay a frequency $x$ one period more than a frequency $y$ can be expressed as $$T = \frac{1}{x-y} \qquad (9)$$

Applying Equation 9 it is found that the delay line 24 should provide a delay of 50 microseconds.

The design of the 90° phase shift circuit 22 presents no problems when the frequency variation is confined to a range of ten percent or less, as in the above example. In such cases a simple resistance-capacitance network is satisfactory. If the frequency band extends much beyond ten percent, more elaborate phase shifters could be used, perhaps including amplifiers with automatically controlled gain to maintain the output voltage magnitudes equal. However, for large frequency ranges such as 10:1 or more, other arrangements such as those shown in FIGS. 5 and 6 are preferred.

Figure 5:
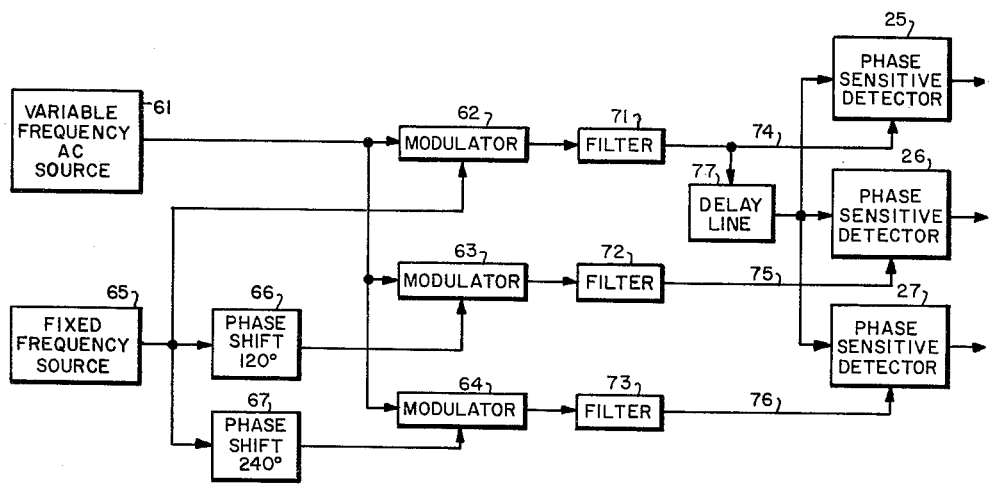
FIGURE 5 is a block diagram of a modification of the embodiment of FIG. 3.
Figure 6:
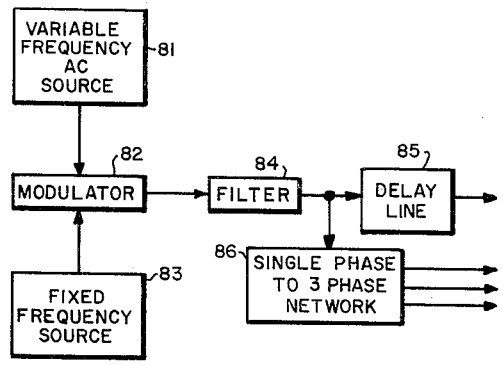
FIGURE 6 is a block diagram of another modification of the embodiment of FIG. 3.

Referring now to FIG. 5, there is shown a variable frequency voltage source 61 connected to three modulators 62, 63 and 64. The source 61 may operate in either the audio or radio frequency range and for illustrative purposes it will be assumed to vary over the range from 1 kc. p.s. to 20 kc. p.s. Also shown is a fixed frequency source 65 such as an oscillator the frequency of which is not critical but which will be assumed for illustrative purposes to be 25 kc. p.s. The source 65 is connected to two phase shift circuits 66 and 67 which provide output voltages shifted in phase from the input by 120° and 240° respectively. Since these phase shifters operate at but a single frequency, no design problem is present.

The purpose of the source 65 and the phase shifters 66 and 67 is to generate three voltages of the same frequency displaced in phase from each other by 120° and any arrangement for obtaining such voltages is satisfactory. For example, a network which generates three such voltages from the source 65, none of which are in phase with the source 65, would be satisfactory, or a 3-phase oscillator could be used. However, the arrangement illustrated is straightforward and simple and is preferred at present.

The source 65 in addition to being connected to the circuits 66 and 67 is also connected directly to the modulator 62 while the outputs of the phase shifting circuits 66 and 67 are connected to the modulators 63 and 64 respectively. The modulators generate the usual modulation frequencies including the sum of the input frequencies which are of present interest. The modulators 62, 63 and 64 are followed by filters 71, 72 and 73 which pass the band containing the sum frequencies (the band from 26 kc. p.s. to 45 kc. p.s. in the present example) while attenuating all other frequencies. The output voltages of the filters appearing on conductors 74, 75 and 76 are of course 25 kc. p.s. higher in frequency than the source 61 and in addition are displaced in phase from each other by 120°. These voltages are applied to the three phase sensitive detectors 25, 26 and 27 respectively.

The phase shift proportional to the frequency of source 61 is provided by a delay line 77 the input of which may be connected to any one of the conductors 74, 75 or 76, and is illustrated in the drawing as being connected to the conductor 74. The output of the delay line 77 is connected to all three of the phase sensitive detectors 25, 26 and 27. The remainder of the circuit is the same as that shown in FIG. 3.

In operation, the apparatus of FIG. 5 is similar to that of FIG. 3. The three voltages displaced in phase from each other by 120° appear on the conductors 74, 75 and 76 and are applied to the phase sensitive detectors 25, 26 and 27 just as are the three voltages from the network 23 of FIG. 3. The delay line 77 provides a voltage the phase shift of which is a linear function of the frequency of the voltage on conductor 74 and since this frequency is a linear function of the frequency of the source 61, the phase shift provided by the delay line 77 is also a linear function of the frequency of the source 61. The range of frequencies in the illustrated example is 19 kc. p.s. so the use of a 50 microsecond delay line would provide a small amount of leeway and would be satisfactory. However, the delay line should be selected or designed to operate properly over the range of 26 kc. p.s. to 45 kc. p.s., in the example being considered.

It is noted that the arrangement of FIG. 5 eliminates the need for a broad band phase shifter by shifting the phase of a fixed frequency and then varying the frequency of the phase shifted voltages.

FIG. 6 shows another approach to the problems inherent in the configuration of FIG. 3 regarding a broad band phase shifter. As shown in FIG. 6, the source 81 is connected to a modulator 82 where the input voltage of variable frequency is mixed with the voltage from a fixed frequency source 83 to obtain an output of higher frequency. The output of the modulator 82 is passed through a filter 84 which passes only the desired modulation products, for example, the sum frequencies, and attenuates all others. The output of the filter 84 is connected to a delay line 85, comparable to the delay line 24 of FIG. 3, and to a network 86 which generates three voltages displaced in phase from each other by 120°, and which may comprise a 90° phase shifter such as the circuit 22 of FIG. 3 in combination with a two phase to three phase network such as the network 23 of FIG. 3, or any other suitable arrangement. The remainder of the circuit may be as shown in FIG. 3.

If the source 81 varies over a range from 1 kc. p.s. to 20 kc. p.s., the source 83 may have a frequency in the hundreds of kilocycles range, for example 200 kc. p.s. Then the output of the modulator 82 and the filter 84 will vary from 201 kc. p.s. to 220 kc. p.s. Such a range obviously makes the design of the phase shifter much easier since the required bandwidth is only about 10%. However, the filter 84 must pass the lowest sum frequency of 201 kc. p.s. while rejecting the highest difference frequency of 199 kc. p.s. Lower frequencies of the source 83 reduce the filter design problem at the expense of the phase shifter design problem while higher frequencies have the opposite effect. Of course, if the source 81 varies over a smaller range, such as from 20 kc. p.s. to 40 kc. p.s., neither problem is severe.

Figure 7:
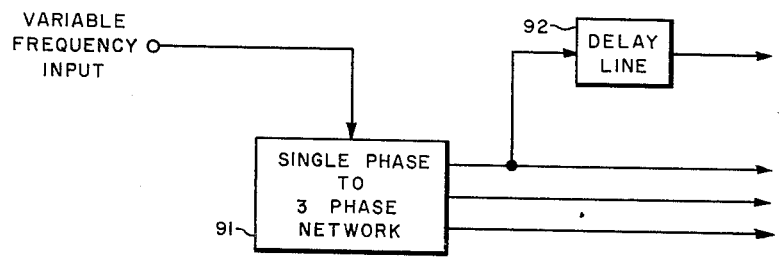
FIGURE 7 is a block diagram of yet another modification which can be applied to the embodiments of FIGS. 3 and 6.

FIG. 7 shows a minor modification which may be employed with either the apparatus of FIG. 3 or the apparatus of FIG. 6. The variable input frequency, such as from the source 21 of FIG. 3 or the filter 84 of FIG. 6, is connected to a single phase to three phase network 91 as before. The delay line 92, instead of being connected to the input, is connected to one of the outputs of the network 91. Operation remains substantially the same as in the cases previously discussed.

In summary, it is apparent that applicants have provided apparatus for generating three wire information indicative of the frequency of a variable frequency alternating current source. In each embodiment described an alternating voltage is generated the phase of which is a linear function of the input frequency. This voltage is separately detected by three phase sensitive detectors controlled by three additional voltages displaced in phase from each other by 120° so as to generate three unidirectional voltages the magnitudes of which are different sinusoidal functions of the input frequency. These unidirectional voltages are then converted to suitable alternating voltages.

If the input frequency varies over a small range such as 10% or less, the embodiment of FIG. 3 is satisfactory. For larger frequency variations, such as two to one, the arrangement of FIG. 6 is usually more convenient. The embodiment of FIG. 5 is suitable not only for small frequency variations but also for large variations such as twenty or thirty to one.

While a number of specific embodiments of the invention have been described, many modifications within the spirit of the invention will occur to those skilled in the art. It is therefore desired that the protection afforded by letters patent be limited only by the true scope of the appended claims.

What is claimed is:

1. Signal transforming apparatus comprising, a source of alternating current of variable frequency, means for generating first, second and third alternating voltages displaced in phase from each other by one hundred and twenty degrees, means for generating a fourth voltage the frequency of which is equal to that of said first, second and third voltages and the phase of which with respect to any one of said first, second or third voltages is a linear function of the frequency of said source, means connected to said first, second, third and fourth voltages for generating three unidirectional voltages the magnitude of each of which is a function of the phase angle of said fourth voltage and the phase angle of a different one of said first, second and third voltages, and means for converting each of said unidirectional voltages to an alternating voltage.

2. Apparatus for generating simulated synchro output voltages indicative of the frequency of an alternating current source of variable frequency, comprising, means for generating from said source three alternating voltages displaced in phase from each other by one hundred and twenty degrees, three phase sensitive detector circuits, means for applying a different one of said three voltages to each of said detector circuits, means controlled by said source for generating a voltage the frequency of which is the same at that of the three above mentioned voltages and the phase shift of which with respect to any one of said three voltages is a linear function of the frequency of said source, means for applying said last named voltage to all of said phase sensitive detector circuits whereby three unidirectional voltages are obtained, and means for converting each of said unidirectional voltages to an alternating voltage.

3. Signal conversion apparatus, comprising a source of alternating current of variable frequency, means for generating first, second and third voltages of identical frequency but displaced in phase from each other by one hundred and twenty degrees, the frequency of said voltages being a linear function of the frequency of said source, means for generating a fourth voltage the frequency of which is the same as that of said first, second and third voltages and the phase of which with respect to any one of said first, second or third voltages is a linear function of the frequency of said source, means energized by said first, second, third and fourth voltages for generating three unidirectional voltages the magnitude of each of which is determined by the difference between the phase angle of said fourth voltage and the phase angle of a different one of said first, second and third voltages, and means for converting each of said unidirectional voltages to an alternating voltage.

4. Signal converting apparatus, comprising, a source of alternating voltage of variable frequency, means for generating first, second and third alternating voltages of identical frequency but displaced in phase from each other by one hundred and twenty degrees, the frequency of said voltages being a linear function of the frequency of said source, means including a delay line for generating a fourth voltage the frequency of which is the same as that of said first, second and third voltages and the phase angle of which with respect to any one of said first, second or third voltages is a linear function of the frequency of said source, means energized by said first, second, third and fourth voltages for generating three unidirectional voltages the magnitude of each of which varies sinusoidally with the phase angle of said fourth voltage, said three unidirectional voltages having maximum magnitudes at values of said phase angle displaced one hundred and twenty degrees from each other, and means for converting said unidirectional voltages to alternating voltages of the same frequency.

5. Signal conversion apparatus, comprising, a variable frequency source of alternating voltage, means for generating first, second and third alternating voltages displaced in phase from each other by one hundred and twenty degrees, the frequency of which voltages is the same linear function of the frequency of said source, means for generating a fourth alternating voltage of the same frequency as that of said first, second and third voltages the phase shift of which with respect to any one of said first, second and third voltages is a linear function of the frequency of said source, three phase sensitive detector circuits each generating a unidirectional voltage the magnitude of which varies sinusoidally in accordance with the difference in the phase angles of two alternating input voltages, means for applying said fourth voltage to all of said detector circuits, means for applying one of said first, second and third voltages to each of said detector circuits, whereby three unidirectional voltages are obtained, and means for converting each of said unidirectional voltages to an alternating voltage of convenient frequency the magnitudes of which are linear functions of the respective unidirectional voltages.

6. Signal conversion apparatus, comprising, a variable frequency source of alternating voltage, means for generating first, second and third alternating voltages of identical frequency displaced in phase from each other by one hundred and twenty degrees, the frequency of which voltages is a linear function of the frequency of said source, means including a delay line for generating a fourth alternating voltage of the same frequency as that of said first, second and third voltages the phase shift of which relative to any one of said first, second or third voltages is a linear function of the frequency of said source, three phase sensitive detector circuits each for generating a unidirectional voltage the magnitude of which varies sinusoidally in accordance with the difference in the phase angles of two alternating input voltages of the same frequency, means for applying said fourth voltage to all of said detector circuits, means for applying a different one of said first, second and third voltages to each of said detector circuits, whereby three unidirectional voltages are obtained, and means for converting said three unidirectional voltages to three alternating voltages of the same constant frequency, the magnitudes of said three alternating voltages being a linear function of the magnitudes of the respective unidirectional voltages.

7. Signal conversion apparatus, comprising, a variable frequency source of alternating voltage, means for generating three alternating voltages of the same fixed frequency displaced in phase from each other by one hundred and twenty degrees, three modulators, means for applying a different one of said three voltages to each of said modulators, means for applying the voltage from said source to all of said modulators, whereby there are obtained three additional voltages of the same frequency which frequency is a linear function of the frequency of said source, the phases of said additional voltages being displaced from each other by one hundred and twenty degrees, means for generating an auxiliary voltage having the same frequency as said additional voltages and the phase of which relative to said additional voltages is a linear function of the frequency of said source, means energized by said auxiliary voltage and said additional voltages for generating three unidirectional voltages the magnitude of each of which is a function of the phase angle of said auxiliary voltage and the phase angle of a different one of said additional voltages, and means for converting each of said unidirectional voltages to an alternating voltage.

8. Signal conversion apparatus, comprising, a variable frequency source of alternating voltage, a fixed frequency source of alternating voltage, first and second phase shifters connected to said fixed frequency source, said first phase shifter being for shifting the phase of the applied voltage by one hundred and twenty degrees, said second phase shifter being for shifting the phase of the applied voltage by two hundred and forty degrees, first, second and third modulators, means for applying the voltage of said variable frequency source to all of said modulators, means for applying the voltage of said fixed frequency source to said first modulator, means for applying the voltage outputs of said first and second phase shifters to said second and third modulators respectively, whereby there are obtained three additional voltages of identical frequency which frequency is a linear function of the frequency of said variable frequency source, said additional voltages being displaced in phase from each other by one hundred and twenty degrees, means for generating an auxiliary voltage having the same frequency as said additional voltages and the phase of which relatvie to said additional voltages is a linear function of the frequency of said source, means energized by said auxiliary voltage and said additional voltages for generating three unidirectional voltages the magnitude of each of which is a sinusoidal function of the difference between the phase angle of said auxiliary voltage and the phase angle of one of said additional voltages, and means for converting each of said unidirectional voltages to an alternating voltage.

9. Signal conversion apparatus, comprising, a variable frequency source of alternating current, means for generating three alternating voltages of the same fixed frequency displaced in phase from each other by one hundred and twenty degrees, three modulators, means for applying a different one of said three voltages to each of said modulators, means for applying the voltage from said source to all of said modulators, whereby there are obtained three additional voltages of the same frequency which frequency is a linear function of the frequency of said source, the phases of said additional voltages being displaced from each other by one hundred and twenty degrees, a delay line energized by one of said additional voltages for generating an auxiliary voltage having the same frequency as said additional voltages and the phase of which relative to said additional voltages is a linear function of the frequency of said source, three phase sensitive detector circuits each for generating a unidirectional voltage the magnitude of which is a sinusoidal function of the difference in the phase angle of two alternating input voltages, means for applying the output of said delay line to all of said detector circuits, means for applying a different one of said additional voltages to each of said detector circuits whereby three unidirectional voltages are obtained, and means for converting said three unidirectional voltages to three alternating voltages having magnitudes corresponding to the magnitudes of the respective unidirectional voltages.

10. Signal conversion apparatus, comprising, a variable frequency source of alternating voltage, a fixed frequency source of alternating voltage, first and second phase shifters connected to said fixed frequency source, said first phase shifter being for shifting the phase of the applied voltage by one hundred and twenty degrees, said second phase shifter being for shifting the phase of the applied voltage by two hundred and forty degrees, first, second and third modulators, means for applying the voltage of said variable frequency source to all of said modulators, means for applying the voltage of said fixed frequency source to said first modulator, means for applying the voltage outputs of said first and second phase shifters to said second and third modulators respectively, whereby there are obtained three additional voltages of identical frequency which frequency is a linear function of the frequency of said variable frequency source, said additional voltages being displaced in phase from each other by one hundred and twenty degrees, a delay line energized by one of said additional voltages for generating an auxiliary voltage having the same frequency as said additional voltages and the phase of which relative to said additional voltages is a linear function of the frequency of said source, three phase sensitive detector circuits each for generating a unidirectional voltage the magnitude of which varies sinusoidally in accordance with the difference in the phase angles of two alternating input voltages of the same frequency, means for applying the voltage output of said delay line to all of said detector circuits, means for applying a different one of said additional voltages to each of said detector circuits whereby three unidirectional voltages are obtained, and three converting circuits each energized by one of said unidirectional voltages and each for converting one of said unidirectional voltages to an alternating voltage the phase and magnitude of which is indicative of the polarity and magnitude of the corresponding unidirectional voltage.

11. Signal conversion apparatus, comprising, a variable frequency source of alternating voltage, means for generating three alternating voltages displaced in phase from each other by one hundred and twenty degrees, the frequency of said voltages being the same as that of said source, means for generating an auxiliary voltage of the same frequency the phase of which is a linear function of the frequency of said source, means energized by said three voltages and said auxiliary voltage for generating three unidirectional voltages the magnitude of each of which is a sinusoidal function of the phase angle of said auxiliary voltage and the phase angle of a different one of said three voltages, and means for converting each of said unidirectional voltages to an alternating voltage.

12. Signal conversion apparatus, comprising, a variable frequency source of alternating voltage, a phase shifting circuit connected to said source for generating three alternating voltages displaced in phase from each other by one hundred and twenty degrees, a delay line having a linear phase shift versus frequency characteristic connected to said source, means energized by said three voltages and the output voltage of said delay line for generating three unidirectional voltages the magnitude of each of which varies sinusoidally with the phase angle of the output voltage of said delay line, said three unidirectional voltages having maximum magnitudes at values of said phase angle which are displaced one hundred and twenty degrees from each other, and means for converting each of said unidirectional voltages to an alternating voltage.

13. Signal conversion apparatus, comprising, a source of alternating voltage of variable frequency, phase shifting means connected to said source for generating three alternating voltages displaced in phase from each other by one hundred and twenty degrees, means including a delay line for generating an auxiliary voltage of the same frequency as said source, the phase of which voltage with respect to said source is a linear function of the frequency of said source, three phase sensitive detector circuits each for generating a unidirectional voltage the magnitude of which varies sinusoidally in accordance with the difference in the phase angles of two alternating input voltages, means for applying said auxiliary voltage to all of said detector circuits, means for applying a different one of said three alternating voltages to each of said detector circuits, whereby three unidirectional voltages are obtained, and means for converting each of said unidirectional voltages to an alternating voltage.

14. Signal conversion apparatus, comprising, a source of alternating voltage of variable frequency, a first phase shifting circuit energized by said source for generating two voltages displaced in phase from each other by ninety degrees, a second phase shifting circuit energized by the output voltages of said first circuit for generating three alternating voltages displaced in phase from each other by one hundred and twenty degrees, a delay line energized by said source for generating an auxiliary voltage the phase of which with respect to the voltage of said source is a linear function of the frequency of said source, three phase sensitive detector circuits all connected to said auxiliary voltage and each connected to a different one of said three alternating voltages, said detector circuits each comprising means for generating a unidirectional voltage the magnitude of which varies sinusoidally in accordance with the difference in the phase angles of its two input voltages, and means for converting the unidirectional output voltages of said detector circuits to three alternating voltages of the same constant frequency, the magnitudes of said last named three alternating voltages being a linear function of the magnitudes of the respective unidirectional voltages.

References Cited in the file of this patent

UNITED STATES PATENTS

| | | |
|---|---|---|
| 2,580,148 | Wirkler | Dec. 25, 1951 |
| 2,585,532 | Briggs | Feb. 12, 1952 |
| 2,896,162 | Berger et al. | July 21, 1959 |
| 2,898,412 | Linn | Aug. 4, 1959 |
| 2,902,649 | Bachmann | Sept. 1, 1959 |
| 2,951,206 | Fredendall | Aug. 30, 1960 |
| 2,964,622 | Fire | Dec. 13, 1960 |
| 3,004,219 | Albert | Oct. 10, 1961 |
| 3,012,200 | Hurvitz | Dec. 5, 1961 |

FOREIGN PATENTS

| | | |
|---|---|---|
| 472,643 | Canada | Apr. 3, 1951 |